(12) United States Patent  
Webber

(10) Patent No.: US 7,736,078 B2  
(45) Date of Patent: Jun. 15, 2010

(54) MODULAR ERGONOMIC, MULTI-FUNCTION, MULTI-LAYER, UNIVERSAL STANDARD KEYBOARD

(76) Inventor: Henry Webber, 302 Olive St., Santa Barbara, CA (US) 93101

( * ) Notice: Subject to any disclaimer, the term of this patent is extended or adjusted under 35 U.S.C. 154(b) by 2091 days.

(21) Appl. No.: 09/879,472

(22) Filed: Jun. 11, 2001

(65) Prior Publication Data

US 2002/0015609 A1 Feb. 7, 2002

Related U.S. Application Data

(63) Continuation-in-part of application No. 09/588,099, filed on Jun. 1, 2000, now abandoned.

(51) Int. Cl.
*B41J 5/00* (2006.01)
(52) U.S. Cl. .......................... 400/489; 400/486; 341/23
(58) Field of Classification Search ................. 400/472, 400/485, 486, 489; 341/22, 23; 345/168
See application file for complete search history.

(56) References Cited

U.S. PATENT DOCUMENTS 3,225,883 A * 12/1965 Ayres ........................ 400/94
D387,340 S * 12/1997 Pham ........................ D14/115
6,067,033 A * 5/2000 An ............................. 341/22

* cited by examiner

*Primary Examiner*—Ren Yan
(74) *Attorney, Agent, or Firm*—Vic Lin; Myers Andras Sherman LLP

(57) ABSTRACT

An electronic keyboard having an improved ergonomic design for use with computers and other alphanumeric input electronic devices is disclosed. Repetitive motion stress on a typist's hands, wrists and fingers is substantially reduced by relocating and centering the ENTER and BACKSPACE keys to a location central to the keyboard so as to be index finger activated, with the ENTER key extending up into the home row, thereby reducing wrist flexure. The alphanumeric keys are disposed in an ortholinear array, with substantially vertical columns and substantially horizontal rows and functional keys are grouped into rationally apportioned areas below the alphanumeric keys of the keyboard. Certain of the keys have up to three different functions, depending upon whether the keyboard is in QWERTY mode, Dvorak mode, or numeric keypad mode. The numeric keypad is provided as an "underlay" to the right-hand portion of the alphanumeric keyboard, thereby producing a very compact keyboard with full numeric keypad editing functionality.

32 Claims, 13 Drawing Sheets

MODULAR ERGONOMIC, MULTI-FUNCTION, MULTI-LAYER, UNIVERSAL STANDARD KEYBOARD

CROSS REFERENCE TO RELATED APPLICATIONS

This application is a continuation-in-part of U.S. patent application Ser. No. 09/588,099, entitled MODULAR ERGONOMIC UNIVERSAL KEYBOARD SYSTEM, filed Jun. 1, 2000 now abandoned, commonly owned with the present application, the entire contents of which are expressly incorporated herein by reference.

FIELD OF THE INVENTION

The invention relates generally to electronic keyboards for use with computers and other electronic alpha-numeric input devices and, in particular, to multi-functional, electronic keyboards having an improved ergonomic layout and reduced footprint.

BACKGROUND OF THE INVENTION

Computers and other related electronic devices have become a part of every day life to an extent that would have been unimaginable several decades ago. Computers have become work place necessities and are playing an increasingly important role in personal as well as professional information collection and communication. Axiomatically, in order to communicate with or through a computer system, a user must have an efficient and universally recognizable means by which to enter information, commonly performed with recourse to an alpha-numeric keyboard.

The standard computer keyboard layout is recognized as being a carry-over from the days of mechanical typewriters, when mechanical linkages were required to connect the keys to the internal mechanisms of the typewriter. Much of the keyboard layout was dictated by the limitations of these mechanical linkages. For example, the well known staggering of the rows of keys in the standard keyboard layout (resulting in the well known slanting key columns) originally served to allow the linkages associated with one row of keys to be positioned between the keys of the preceding higher rows. Additionally, the standard "QWERTY" key layout was originally adopted to limit typing speeds and space-out alternating letters to the greatest degree possible, in order to prevent jammed key linkages.

Because of the perception that any changes to the standard keyboard layout would require costly retraining of typists, the standard keyboard layout has survived virtually unchanged to the present day. As new or additional functions have been added to office machines and computers, the additional keys needed to implement these functions have generally been added at the periphery of the standard keyboard layout. That result is the keyboard layout which is known to be inefficient and which could contribute to debilitating injuries from repetitive motion and awkward positions of the shoulders, arms, wrists and hands, during every day use.

The manner in which the keyboard is used has also changed significantly since the days of the mechanical typewriter. For example, keyboard users are no longer required to depress the <ENTER> key at the end of each line, since most software includes the ability to automatically "wrap" text to the next line, obviating the need for a carriage return. Other keys, such as <BACKSPACE>, are now used much more frequently than they were on typewriters, while keys for certain basic computer-type operations such as "navigating" through a document or accessing common operating high-system functions, had no counterparts on conventional typewriters.

It is also now nearly universal for a computer user to use a pointing device, most commonly a mouse, simultaneously with the keyboard as an input device. In order to accommodate both forms of input devices, the user must typically continually move one hand back and forth between the keyboard to the mouse in order to access their particular functions. For right-handed keyboard users (the vast majority), the mouse is often placed to the right of the keyboard, with the distance from the right hand "home" position of a typical desk top keyboard to the mouse often exceeding 20 inches.

Originally adapted for use only on typewriters, keyboards have become ubiquitous as input devices for a vast range of electronic appliances, including notebook computers, personal organizers, e-mail telephone devices, web-TV controllers, game devices, industrial control consoles, and are now appearing as input devices for home appliances. The standard desk top keyboard layout is often not fully suited to these "new" applications, both because of its irrational layout and its elongated shape and footprint. The standard keyboard has often been adapted to new uses by arbitrarily relocating keys around the periphery of the keyboard and/or by overlaying functions on top of the alpha-numeric keys. The result is an increasing number of specialized keyboard layouts, resulting in a variety of purpose-specific systems and the lack of a truly universal standard.

The standard keyboard layout is also generally known to have ergonomic shortcomings which cause fatigue with extended use and which, over time, can result in debilitating injuries from "repetitive stress". Much of the stress placed on the shoulders, arms and wrists when using the traditional keyboard are the result of unnatural hand positions, wherein the hands are placed directly next to one another on the keyboard. This position requires either that the wrists be continually flexed while the arms are held against the body. Additional stress is caused by the need to continually rotate the wrist in order to access commonly used keys such as <SHIFT> and <BACKSPACE>.

Many companies have attempted unsuccessfully over the years to biomechanically solve the stress-related design issues that are inherent in standard keyboard layouts. Unfortunately, the so called "ergonomic keyboards" that have been developed thus far disregard the importance of key position and key layout, reach and extension of a typists' fingers, and the physical size of the key surface. Several manufacturers claim to produce "split hand" keyboards, but in actuality the keyboards are nothing more than "fan" boards in which the hands are angled to a more natural position but remain close to one another. This type of design alleviates some stress on the hands but this stress is merely relocated by having the user position their shoulders and elbows in non-neutral adducted and internally rotated positions. Further, some of these designs position the keyboard surface along a positive slope that extends the wrists into non-neutral postures. Others have complex shapes which add significantly to their cost of manufacture.

Notwithstanding the foregoing, none of the presently implemented "ergonomic" keyboards address the issue of repetitive stress induced injuries resulting from constant rotation and displacement of the wrist by an inappropriate placement of the <ENTER> and <BACKSPACE> keys. It is well understood that the constant wrist rotation and finger extension required to repetitively access these keys may be a major culprit in the most commonly reported repetitive stress injuries by typists.

In addition to these ergonomic deficiencies, conventional keyboards exhibit an inordinately large footprint, particularly when the keyboard is a "full function" keyboard, such as those incorporating a "function", or "editing" pad, along with a numeric key pad, in addition to the standard alpha-numeric key layout. Conventionally, all of these extra functional key portions are disposed linearly across the keyboard and are arranged side-by-side-by-side. This results in a very high length aspect for these keyboards, making them particularly troublesome to use in connection with a small appliance. Given that appliance sizes are being constantly scaled to smaller and smaller footprints, the benefits of reduced appliance area might not be realizable if each appliances' input device, i.e., the keyboard, were an overly large and clumsy apparatus.

Accordingly, there is a strong need for new keyboard designs which reflect the manner in which keyboards are being presently used in connection with modern electronic appliances and which incorporate such appliances' functional keys without distorting or extending the keyboard layout. These new keyboard designs should incorporate a key layout which supports systematic relaxation of a users' posture as well as reducing the amount of repetitive movement of the wrists and fingers. There is also a need for keyboard modules, which include left-hand and right-hand modules, along with editing pad/numeric pad keypad modules, which can be applied to the increasing range of keyboard applications, without the need to reconfigure the basic layouts of the modules for each new application. The keyboard designer should represent a universal standard, and incorporate the functions and an editing pad/numeric key pad within the dimensional footprint conventionally allocated solely to the alpha-numeric portion of the keyboard. This should be done while maintaining the key area at full size.

The new keyboard design should ideally be easy for experienced keyboard users to master as well as being inexpensive to produce.

BRIEF SUMMARY OF THE INVENTION

It is the object of the present invention to provide keyboard designs with improved ergonomic layouts for reducing stress and injury while increasing typing efficiency and accuracy. In particular, a universal keyboard of the type comprising an alphanumeric portion having keys arranged in a plurality of substantially straight vertical columns and a plurality of substantially straight horizontal rows, including a home row, so as to define an ortholinear array, comprises left and right hand SHIFT keys, the SHIFT keys elongated vertically and oriented substantially parallel to the substantially straight vertical rows, the SHIFT keys including a portion disposed in-line with the keys of the home row. A centrally disposed ENTER key is provided, the ENTER key elongated vertically and oriented substantially parallel to the substantially straight vertical rows, the ENTER key including a first portion disposed in-line with the keys of the home row and a second portion disposed in-line with the keys of the row below the home row.

In one aspect of the invention, the universal keyboard comprises a centrally disposed BACK SPACE key, the BACK SPACE key elongated vertically and oriented substantially parallel to the substantially straight vertical rows, the BACK SPACE disposed above the ENTER key and in-line with the keys of the two rows adjacent and above the home row. A horizontally elongated, thumb activated SPACE BAR is disposed adjacent and below the ENTER key. In alternative configurations, the ENTER, BACK SPACE and SPACE BAR keys are vertically separated into independently activated left and right hand portions, or are provided as unitary keys.

In a further aspect of the invention, the universal keyboard comprises a first functional control portion disposed in a rectangular region defining fifth and sixth key rows and located adjacent a first lateral edge of the SPACE BAR. The first functional control portion includes at least a FUNCTION key for placing the keyboard into an operational mode different from a default operational mode. A second functional control portion is disposed in a rectangular region defining fifth and sixth key rows and located adjacent a second lateral edge of the SPACE BAR, the second functional control portion including cursor control navigation arrows disposed in an inverted T configuration.

Additionally, the universal keyboard includes a full-function numeric keypad disposed within the alphanumeric portion and the second functional control portion, the numeric keypad key functions accessible by a user depressing the FUNCTION key. Particularly, a LEFT ARROW key of the navigation arrows defines a 0 key of the numeric keypad, the LEFT ARROW key being two key dimensions in width.

In a further aspect of the invention, a row of function keys is disposed in a row zero position, immediately above and adjacent a numeral row of the alpha portion, the function keys and the second functional control portion defining at least an editing pad. The row zero function keys define a corresponding one of F* keys, the F* functions accessible by a user depressing the FUNCTION key.

The numeric keypad of the multi-mode, universal keyboard according to the invention includes numerals 1 through 9 arranged in a square 3×3 key matrix; a numeral 00 key, positioned adjacent and below the numeral 2 key; an oversized numeral 0 key, positioned immediately left adjacent the numeral 00 key; arithmetic operator keys; and independent left and right PAREN keys, the left and right PAREN keys functional when the keyboard is placed in numeric keypad mode by depressing the NUM LOCK or FUNCTION key.

In summary, the multi-mode, universal keyboard of the invention comprises an alphanumeric portion having keys arranged in a plurality of substantially straight vertical columns and a plurality of substantially straight horizontal rows, including a home row, so as to define an ortholinear array, the keyboard may be defined as multi-mode in that it supports a QWERTY operational mode; a Dvorak operational mode; and a numeric keypad/function operational mode, wherein each operational mode is key-selectable such that particular ones of the keys of the keyboard are functional in accordance with three operational modes.

BRIEF DESCRIPTION OF THE DRAWINGS

These and other features, aspects and advantages of the present invention will be more fully understood when considered in connection with the following specification, appended claims and accompanying drawings, wherein:

DETAILED DESCRIPTION OF THE INVENTION

Figure 1:
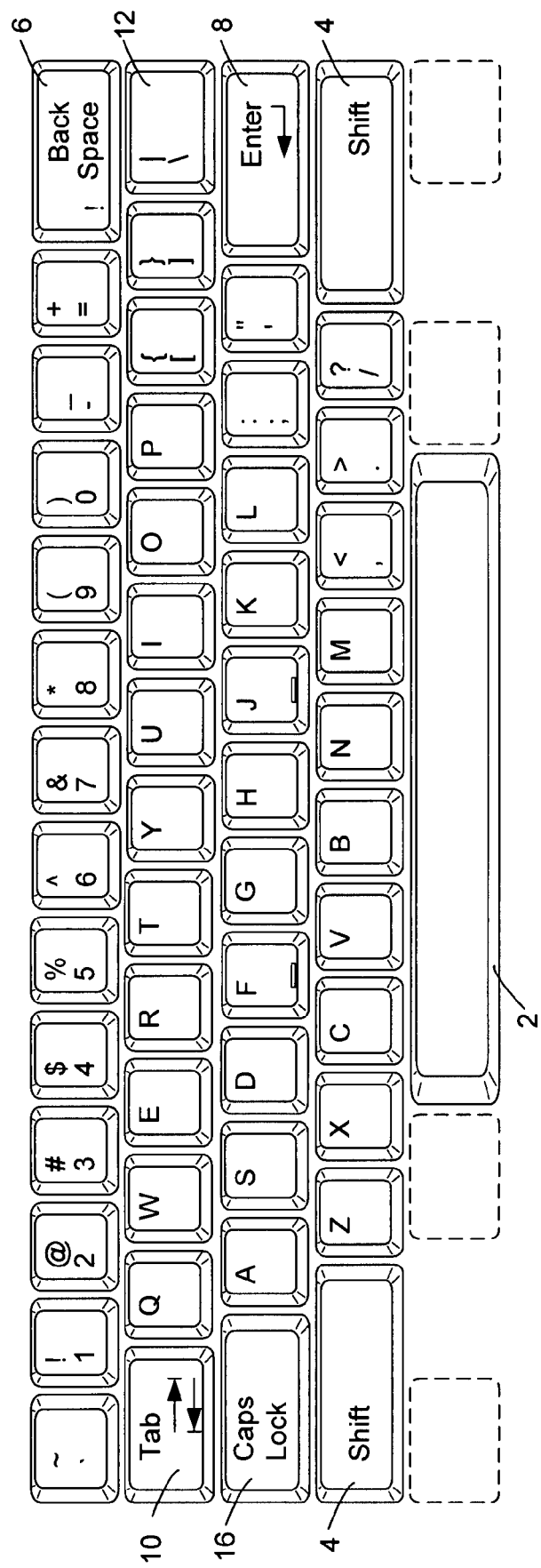
FIG. 1 is an illustration, in plan view, of the key layout of a standard keyboard, in accordance with the prior art.

Briefly, the present invention is directed to a multifunctional universal keyboard system that incorporates all of the standard functionality of conventional keyboards, but fully disposed within a keyboard system that has the footprint of the "alpha" portion of conventional boards, and is constructed to conform to a more ergonomic layout. In the context of the invention, multi-functionality refers to the ability of the keyboard to function in accordance with a number of keyboard modalities, that have heretofore been provided as separate features, accessed with their own key layout. Particular ones of these include the standard QWERTY "alpha" keyboard layout, the Dvorak "alpha" keyboard layout, an editing pad, and a numeric keyboard or keypad. Multi-functionality is implemented by giving certain ones of the keys the ability to be adaptively placed in any one of the aforementioned modes by striking a particular corresponding "function" key. Since keyboard modalities are functionally independent, i.e., a numeric keypad is accessed independent of the QWERTY alpha keys, for example, mode shifting does not involve any loss of capability.

The ergonomic layout of the keyboard of the present invention is implemented in two conceptual portions; a first portion wherein the keys are disposed in an ortholinear matrix, i.e., vertical columns and horizontal rows, and a second portion wherein functionality is grouped together within easy access of a particular typing "hand" and the keyboard layout is such that all of the keys, regardless of modality, are accessible from the "home row" without requiring large hand, finger or thumb displacements or unnatural wrist or hand rotational movements. In furtherance of the ergonomic layout of the keyboard, certain keys, particularly what one might term the "terminal" keys, such as <ENTER> (conventionally <carriage return>), <BACK SPACE>, and certain of the "function" keys, such as <CAPS LOCK>, <CTRL>, <ALT>, <DELETE>, and the like, have been relocated to positions more conducive to efficient typing, as well as grouped together in locations which are more rationally related to their functionality. In particular, control keys used in navigating and accessing computer based application software programs are grouped together for rational access by an operator.

Thus, the keyboard system in accordance with the invention can be considered as a multi-functional, multi-mode, improved ergonomic keyboard, which might further be termed universal in that it captures all of the various "standard" keyboard operational modes in a single apparatus. QWERTY and Dvorak users, for example, need no longer be concerned about what form or mode of keyboard they are provided with; the keyboard of the invention being adaptable to either form or mode with the press of a "function" key.

It should be noted that when particular ones of the keys are being discussed herein, the name of the key is indicated within carrots <>. The function of a key, or set of keys, is indicated within parens "". Thus the <Ctrl> key is also a "function" key, since striking the <Ctrl> key simultaneously with another key invokes a function, e.g., <Ctrl><Alt><Delete> invokes a functional stop operation on a computer system running the Microsoft WINDOWS operating system.

Figure 2:
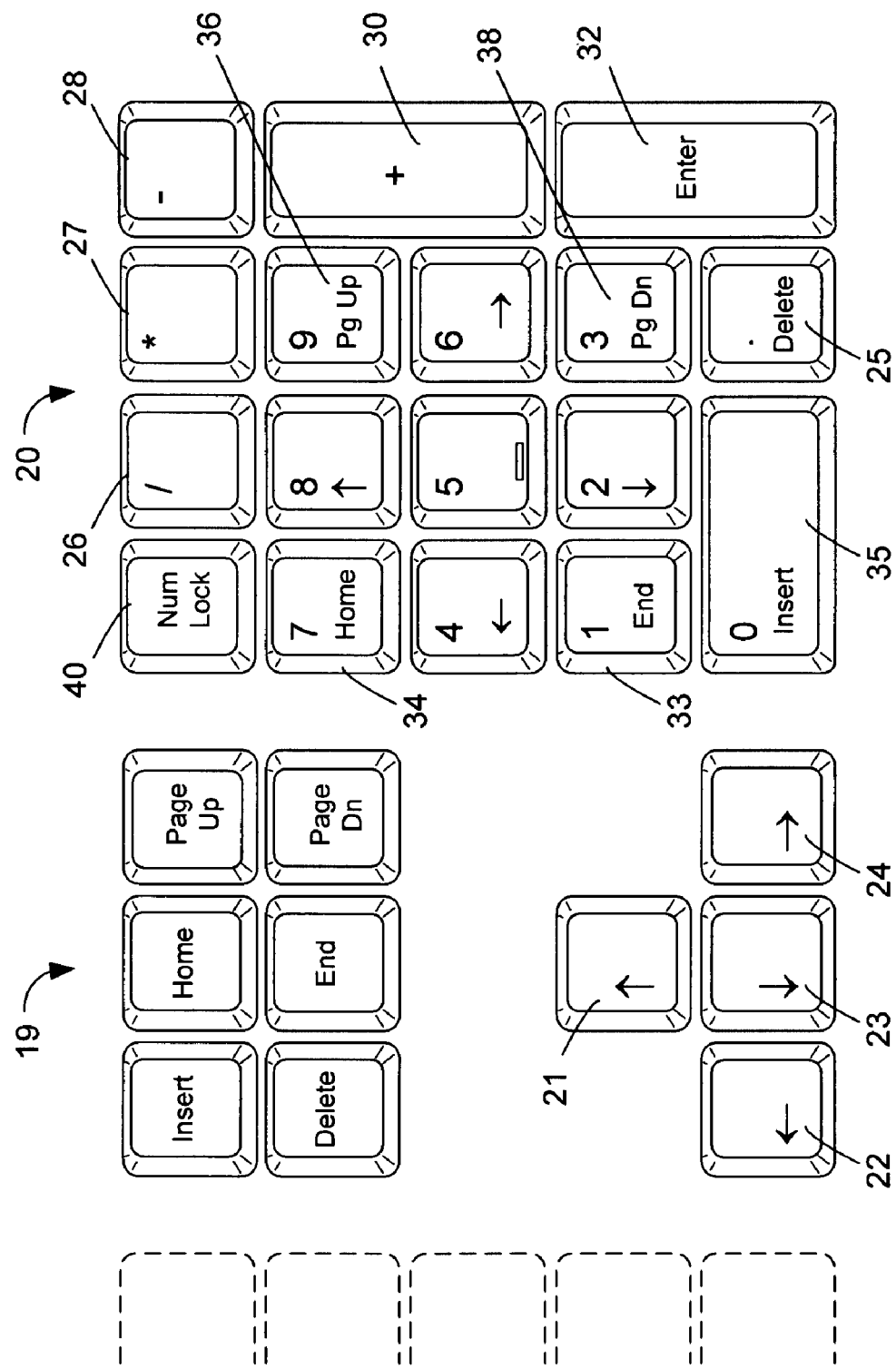
FIG. 2 is an illustration, in plan view, of an editing pad and numeric key pad layout of a conventional keyboard according to the prior art.

Prior to describing the particular features, concepts and layout of the various embodiments of the present invention, it would be worthwhile to review the features, layout and disadvantages of conventional keyboards in accordance with the prior art. FIGS. 1 and 2 illustrate various portions of a conventional keyboard and provide an appropriate background for discussion of the present invention. In particular, FIG. 1 illustrates the well-known conventional prior art-type alphanumeric keyboard layout having "staggered" rows, wherein the keys in one row are offset from those in the rows above and below, and disposed in a standard QWERTY key arrangement. A <SPACEBAR> key 2 is located at the bottom edge of the keyboard. The <SHIFT> keys, each indicated at 4 are disposed, at either side of the keyboard, one key unit high, and located at the left and right ends of the keyboard in the row below the home row; a location that requires a rotation of the wrist each time <SHIFT> is to be activated. The <ENTER> key 8 is located at the extreme right hand of the home row.

A <CAPS LOCK> key 16 is located at the left end of the home row, a location originally dictated by the need to mechanically couple the key to the shift mechanism of the typewriter. This prominent position of the <CAPS LOCK> key is perceived by many keyboard users to be more of a nuisance than a convenience, since it is much too easily activated by mistake, when <SHIFT> 4 or <TAB> 10 is intended.

The <BACKSPACE> key 6 is generally located at the extreme upper right of the keyboard. <BACKSPACE> is typically now used in the fundamentally different manner than when the "standard" alpha-numeric layout of FIG. 1 was developed for typewriters. <BACKSPACE> 6 was once a lightly used key, being used only when it was necessary to underline text, manually center text on the page, or to correct typing errors, all of which were laborious tasks on early typewriters. <BACKSPACE> was thus used as seldom as possible by early typists. In contrast, many modern keyboard users use the <BACKSPACE> key 6 extensively. Modern word processing software applications are particularly suitable for editing and correcting errors "on the fly", an operation which was not particularly feasible for typists using early mechanical systems.

The combined <VERTICAL LINE> and <SLASH> key 12 has been variously located on different keyboard layouts, but is most often found at the right hand edge of the key row just above the home row. Other ancillary keys were typically added around the periphery of the alpha-numeric module (that five row portion of the keyboard which contains the alpha keys, the numeric key row, and the <Space Bar> row, and termed the "alpha" portion herein) for computer-specific needs, as indicated by the phantom outlines in FIG. 1. The overall keyboard dimensions dictated by the "standard" layout, necessarily yields a keyboard footprint that is relatively long and narrow (basically 15 key dimensions wide, by 5 key dimensions tall, for a 1:3 aspect ratio), which makes placing a standard keyboard on smaller devices such as notebook computers, problematic, particularly when it is recognized that a notebook or laptop computer is constructed to conform to an aspect ratio of about 2:3.

FIG. 2 illustrates a common prior art-type configuration of an editing pad and a numeric key pad. Most commonly, on desk top keyboards, a separate editing pad 19 and numeric key pad 20 are provided proximate to the alpha portion and arrayed laterally adjacent, thereby extending the keyboard's width. The editing pad includes a group of keys near the top of the pad for navigating to various sections of a document, including <HOME>, <END>, <PAGE UP> and <PAGE DOWN>, as well as <INSERT> and <DELETE> keys. At the bottom of the editing pad are arrow keys arranged in an inverted "T" configuration, including an <UP ARROW>21, a <LEFT ARROW> 22, a <DOWN ARROW> 23, and a <RIGHT ARROW> 24. Because of its ease of use, the inverted "T" has become nearly universal on keyboards.

The numeric key pad 20 includes keys defining the numerals 0 through 9, arranged in a square, linear, fashion, a <DECIMAL POINT> key 25, keys for the mathematical operations divide </> 26 multiply <*> 27, subtract <−> 28, and add <+> 30. An <ENTER> key 32 is also provided for initiating various functions. Embedded within the numeric key pad are the remnants of an older configuration of an editing pad, with <END> 33, <HOME> 34, <PAGE UP> 36, and <PAGE DOWN> 38, mirroring similarly named keys of the editing pad 19, and arranged at the corners of the square defining the number pad, and arrow keys, arranged in a cross configuration, centered on the numeral 5 key. <INSERT> and <DELETE> keys are placed on the bottom row. Typically, a <NUM LOCK> key 40 occupies the upper left corner of the numeric key pad to select between the numeric key pad functions and editing pad functions.

Figure 3A:
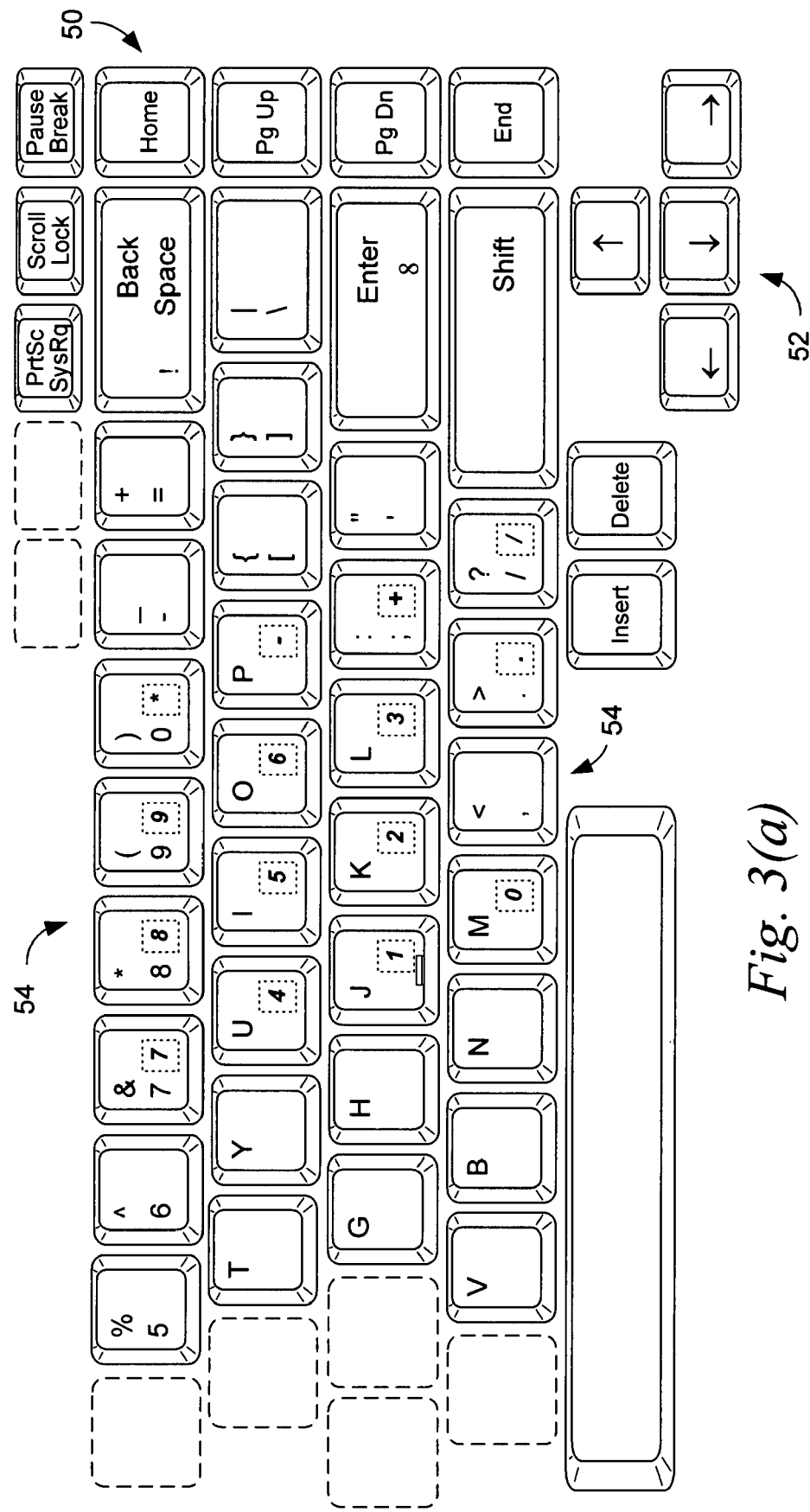
FIG. 3A is an illustration, in plan view, of an embedded editing pad and numeric key pad layout of one embodiment of a conventional laptop keyboard according to the prior art.
Figure 3B:
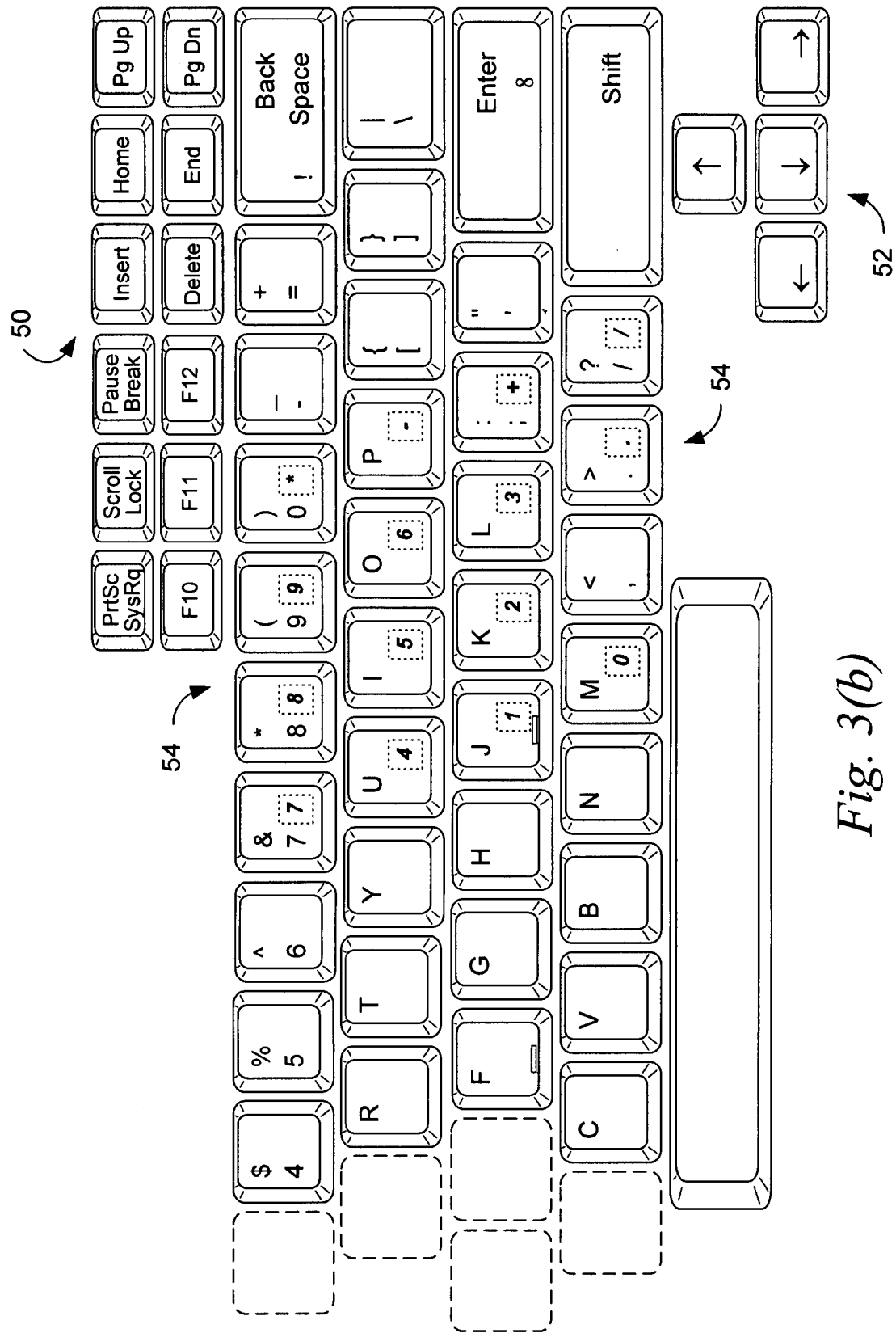
FIG. 3B is an illustration, in plan view, of an embedded editing pad and numeric key pad layout of a second embodiment of a conventional laptop keyboard according to the prior art.

The small area available for a keyboard on notebook computers has precluded the inclusion of separate editing and numeric key pads. Various attempts have been made to incorporate editing and numeric key pad functions into keyboards for notebook computers, usually with limited success. FIGS. 3*a* and 3*b* depict the right end portions of two common notebook keyboard layouts. Navigation keys 50 are typically placed either along the right edge of the keyboard, as in FIG. 3*a* or grouped above the right end of the keyboard as in FIG. 3*b*. Smaller sized keys are typically used because of space constraints, which make the keys difficult to find and use. Navigational arrows, in an inverted "T" configuration, 52 are usually placed at the lower edge of the keyboard.

As shown at 54 in FIGS. 3*a* and 3*b*, a numeric key pad is often embedded into the alpha portion of the keyboard, with the numeric key pad functions shown in a contrasting color to the alpha-numeric functions (indicated by dashed squares in the figures). <NUM LOCK> (not shown) is used to select either the alpha-numeric keyboard functions or the numeric key pad functions. Many keyboard users find this embedded numeric key pad design very awkward, both due to the need to hit the <NUM LOCK> whenever switching between numeric key pad and alpha-numeric entry, and because the numeric key pad necessarily acquires the slant of the alpha-numeric keyboard layout.

The lack of a true "standard" layout for notebook computers, together with the awkwardness of the currently used layouts, suggests the need for a more universal and more ergonomic keyboard layout.

Figure 4:
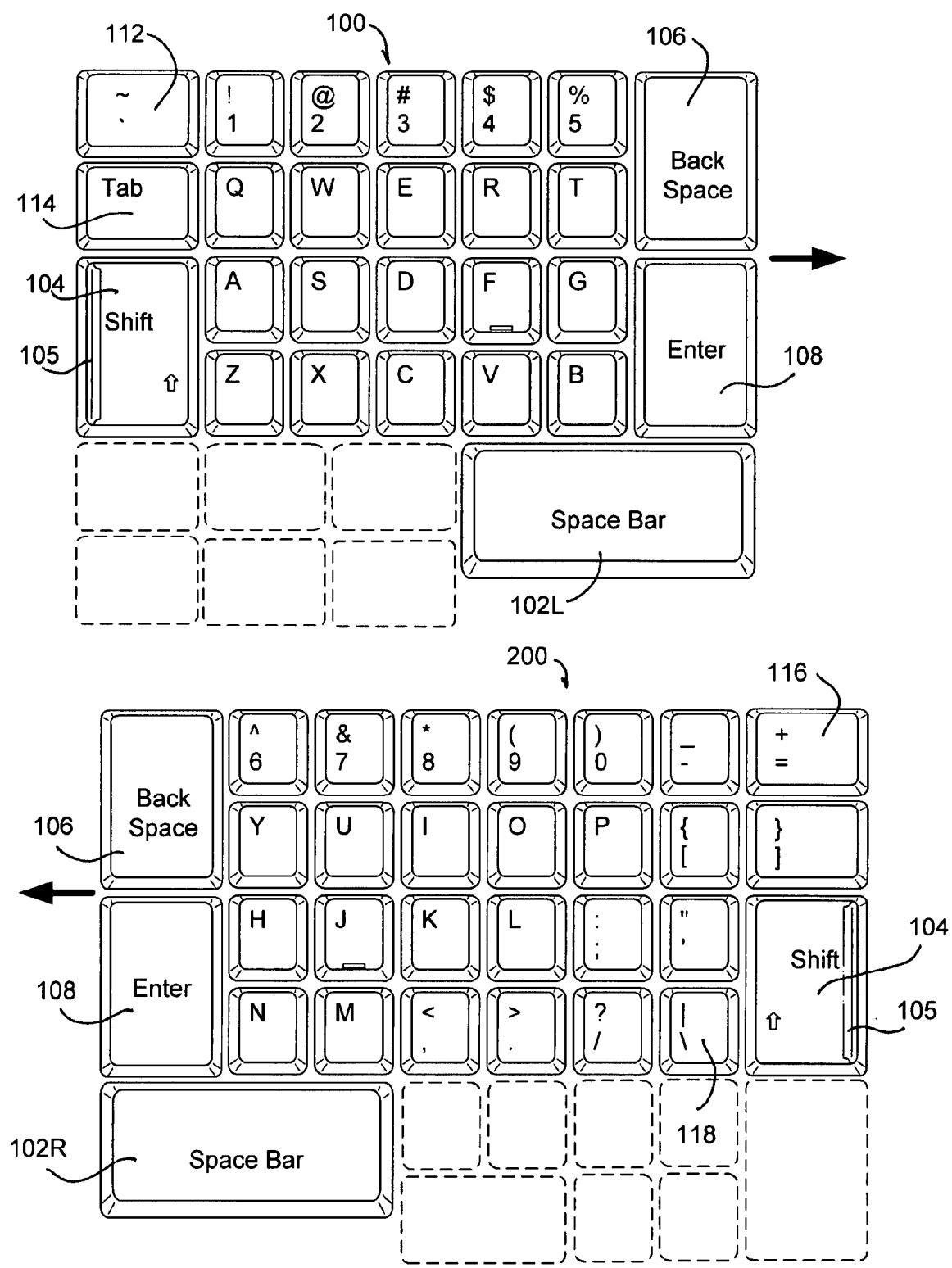
FIG. 4 is an illustration, in plan view, of a first embodiment of a keyboard layout with centrally disposed "terminal" keys, in accordance with the present invention.

As illustrated in the exemplary embodiment of FIG. 4, the alpha-numeric section (alpha portion) of the keyboard comprises a left-hand alpha-numeric module 100 and a right-hand alpha-numeric module 200. For purposes of clarity, only the basic alpha-numeric keys are labeled in the exemplary embodiment of FIG. 4, with ancillary (or "functional") key positions indicated in phantom. The keys comprising each module are arranged in substantially straight horizontal rows and substantially straight vertical columns. Preferably, each module is substantially rectangular in shape, with ancillary keys descending from the rectangle, permitting a variety of keyboard configurations to be constructed from the same basic modular key layouts, as will be discussed in greater detail below. From examination of the exemplary embodiment of FIG. 4, it will be observed that each of the modules have six rows of keys, in the basic configuration, versus the five rows in the prior art keyboard, resulting in a taller but substantially narrower keyboard. However, the additional row of keys adds functionality to the keyboard, the standard five rows (numeral row to <Space Bar> row) retain their conventional key definitions.

Orienting the keys in straight columns and rows, as a "matrix", improves the keyboard in several ways. First, the actual distance between commonly struck keys is reduced, as well as being made more uniform. The keyboard is bilaterally symmetric, requiring less work by the keyboard user and therefore less strain on the hands and fingers. Keyboard users who frequently use numeric key pads having straight rows and columns, are aware that such an arrangement significantly improved data entry speed and accuracy. Also, much of the initial "learning curve" for new keyboard users is a consequence of having to train the fingers to the staggered row configuration. A keyboard having straight rows and columns should be easier for the beginner to master, thus reducing initial learning times.

Although the columns of the keys are straightened, the keyboard layout of the present invention substantially preserves the standard QWERTY configuration, minimizing retraining time for experienced keyboard users. However, as will be described in greater detail below, the keyboard also accommodates other alpha-numeric layouts, such as the Dvorak configuration.

A particularly important ergonomic feature of the present invention is the vertical enlargement of the left and right <SHIFT> keys (both indicated as 104), and their extension downward into the home row. By providing a larger and more convenient "target" for the little finger of each hand, and allowing the <SHIFT> keys 104 to be activated with a minimum of wrist flexure, stress is substantially reduced and typing efficiency is increased. Room for the extension of the <SHIFT> keys into the home row is made available by relocating the <ENTER> 108, <BACK SPACE> 106 and <CAPS LOCK> 110 keys, conventionally disposed along the right and left edge, respectively, of the alpha-numeric keyboard, to a more convenient central location, as will be described in greater detail below.

The outermost column of keys, in each module, represented by the <~> key 112, <TAB> 114, and <SHIFT> key 104 on the left-hand portion, and the <+> 116, <[]> 118 and <SHIFT> 104 keys and the right-hand portion, may also be preferably be made horizontally wider (all keys being of equal width, therefore) than a standard key, providing for an even greater "target" for the little finger of each hand and thereby further reducing stress on the keyboard users' wrists, hands and fingers. Again, providing a larger target for the relatively weak little fingers also potentially increases typing accuracy.

As further depicted in the exemplary embodiment of FIG. 4, the left and right hand portions of the keyboard are provided with separate <SPACE BAR> keys, 102L and 102R, that are disposed side-by-side and which are equally accessible to the respective left and right thumbs of a user. Both <SPACE BAR> keys function the same as the single <SPACE BAR> provided on a conventional prior art-type keyboard, in that compressing either the left or right <SPACE BAR> generates a "space" character. Unlike some prior art keyboards which dedicate a portion of the <SPACE BAR> key to a "back space" function, the present invention preserves the normal function of the <SPACE BAR>. When keyboard versions in which the left and right hand module portions are directly adjacent one another, rather than separated by a nominal space, the two <SPACE BAR> keys may alternatively be replaced by a single, unitary key, as in conventional keyboards.

In accordance with practice of principles of the invention, the exemplary keyboard layout of FIG. 4 illustrates a <BACKSPACE> key 106 which is disposed in a generally centrally located portion of the keyboard, and which is intended to be activated by a users' index finger. In the particular embodiment of FIG. 4, the <BACKSPACE> 106 key is a "split" key, with the key functionality spanning the upper two rows of the alpha-numeric keys, and positioned on the right hand side of the left-hand module portion, and the left hand side of the right-hand module portion. Each <BACKSPACE> key can be accessed by the appropriate left or right index finger of the corresponding hand. Locating the key to the side of the alpha-numeric keyboard portion makes the key easier to reach and provides a larger target than the standard upper right position. The keyboard user does not need to lift one hand from the home row when correcting, thus reducing the number of miss-hits. There is a significantly smaller amount of ulnar deviation required to contact the key and since the little finger is no longer required for its use, the resulting keyboard layout is substantially more comfortable on the hands and wrists of the user.

Similarly, the <ENTER> key 108 has been moved from its conventional location to the outside of the alpha-numeric keyboard to a substantially more comfortable and intuitively accessible position in the center of the alpha-numeric portion of the keyboard. The <ENTER> key is intended to be activated by either the left or right thumb, and in the exemplary embodiment of FIG. 4, is "split" between the left and right hand portions in a manner similar to the <BACKSPACE> key 106. Indeed, the <ENTER> key 108 is positioned directly below the <BACKSPACE> 106 and has the same size, i.e., two key dimensions tall and one and one-half key dimensions in width.

It should be noted that the <BACKSPACE> 106, <ENTER> 108, and <SPACE BAR> 102 keys are arranged in an inverted "T" configuration, and are all substantially oversized so as to be easily accessible to the fingers and thumbs of the typist. Each of these keys have particular importance, not only to a typist, but also to a computer user, wherein they each play a functional role different from their originally contemplated role on a typewriter. These keys are now grouped together in a "central" location of the alpha-numeric keyboard. This central positioning of the <BACKSPACE> and <ENTER> keys makes the particular embodiment of the keyboard of FIG. 4 much more ergonomically suited to modern electronic word processing and computer operational considerations than conventional keyboards.

Further, the </> key 118, essentially an "orphan" on the standard prior art-type keyboard, is now given a permanent and logical home on the right hand end of the alpha-numeric row beneath the home row, adjacent the right hand <SHIFT> key.

It may be observed that the keys which have been modified or relocated, particularly the <SHIFT>, <BACKSPACE>, <CAPS LOCK>, and <ENTER> keys are keys which are relatively frequently used in both word processing applications and in controlling computer operations. By modifying and relocating highly-used keys, while substantially retaining the standard QWERTY configuration of the remaining keys, relearning times for the new keyboard layout are kept to a minimum. Since <SHIFT>, <BACKSPACE>, <CAPS LOCK>, and <ENTER> are hit many times during routine use of the keyboard, the fingers are quickly retrained in the new configuration. Users may also adjust to the modified <SHIFT> keys gradually, as portions of the footprint of these keys still occupy their former "prior art" locations. As a further aid to retraining and correct usage of the <SHIFT> key, a tactile ridge 105 might be incorporated on the outer peripheral edge of each of the <SHIFT> keys in order to aid the little fingers of each hand in recognizing the key.

In the exemplary embodiment of FIG. 4, the central <BACKSPACE>, <ENTER> and <SPACE BAR> keys have been depicted as "split", wherein each of the keys has been bifurcated and separated by a small vertically disposed portion of the keyboard housing, or shell. It will be recognized by those having skill in the art, that this particular arrangement allows the left and right hand keyboard portions to be not only implemented within a unitary keyboard housing but also to be implemented in separate right and left hand independent modules which can be disposed, in space, at any location convenient to a user. As will be described in greater detail below, these right and left hand module portions can be positioned spaced-apart, side-by-side, and/or tilted at any angle with respect to one another, such that any user is able to comfortably position their hands so as to access any key on either module.

Figure 5:
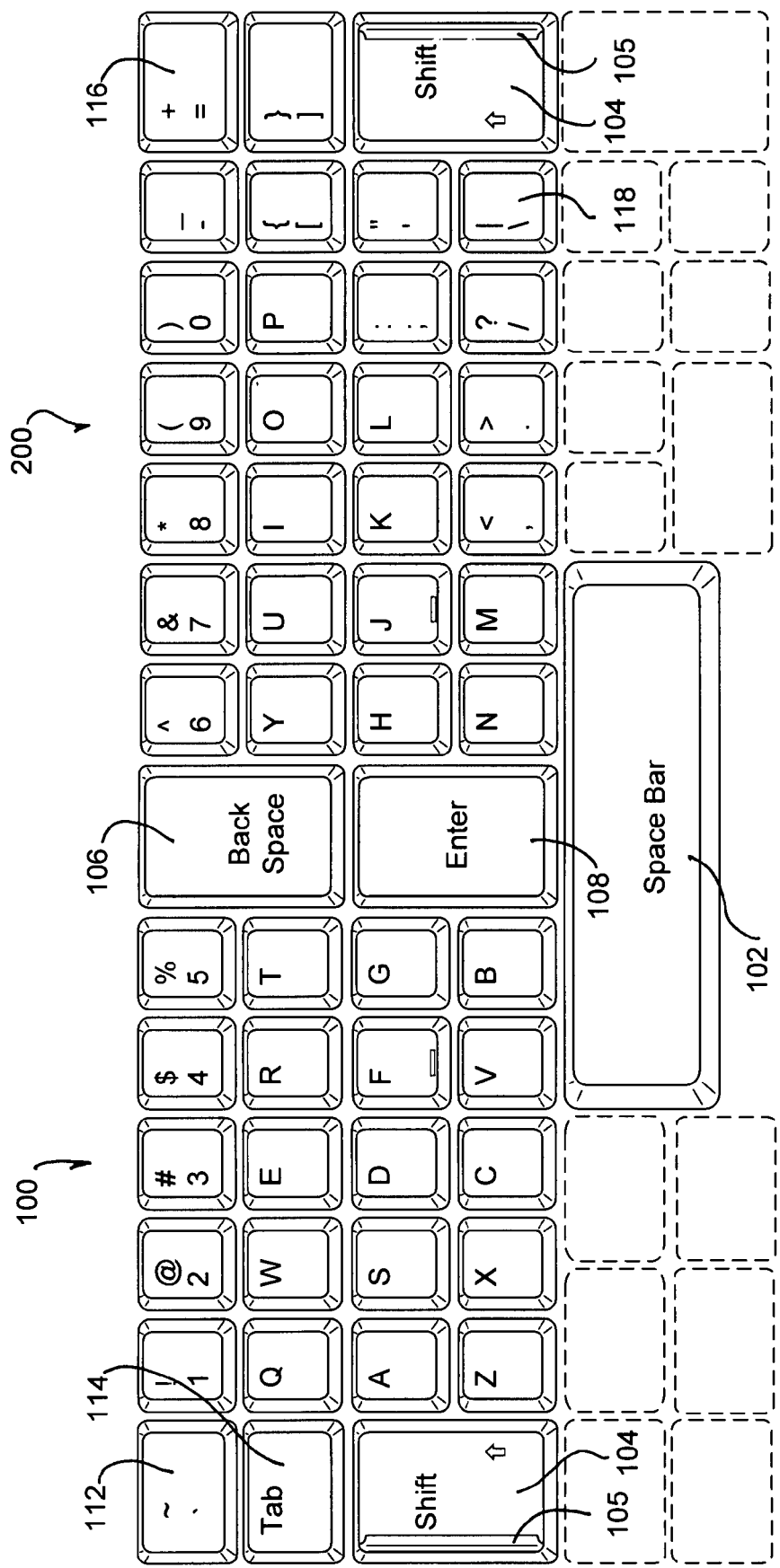
FIG. 5 is an illustration, in plan view, of a second embodiment of a keyboard layout with centrally disposed "terminal" keys, in accordance with the present invention.

It will be further recognized by one having skill in the art, that the central <BACKSPACE>, <ENTER> and <SPACE BAR> keys need not be separated into left and right halves, but may be provided as single, centrally disposed, keys, having oversized footprints (about one and one half key dimensions in width) for easy access, as illustrated in the exemplary embodiment of FIG. 5.

Turning now to FIG. 5, there is depicted an alpha-numeric section of an additional embodiment of a keyboard in which the <BACKSPACE>, <ENTER>, and <SPACE BAR> keys are joined-together horizontally in a central location of the keyboard. For purposes of clarity and ease of explanation, similar keys in the exemplary embodiment of FIG. 5, as in the exemplary embodiment of FIG. 4, will be labeled with the same identifying numeral.

And in the previous case, the exemplary embodiment of FIG. 5 has the keys comprising the keyboard arranged in substantially straight horizontal rows and substantially straight vertical columns. The keyboard is therefore substantially rectangular in shape with the ancillary keys subtending from the alpha-numeric portion and arranged in rational functional groupings to either side of the central <SPACE BAR>.

Figure 6:
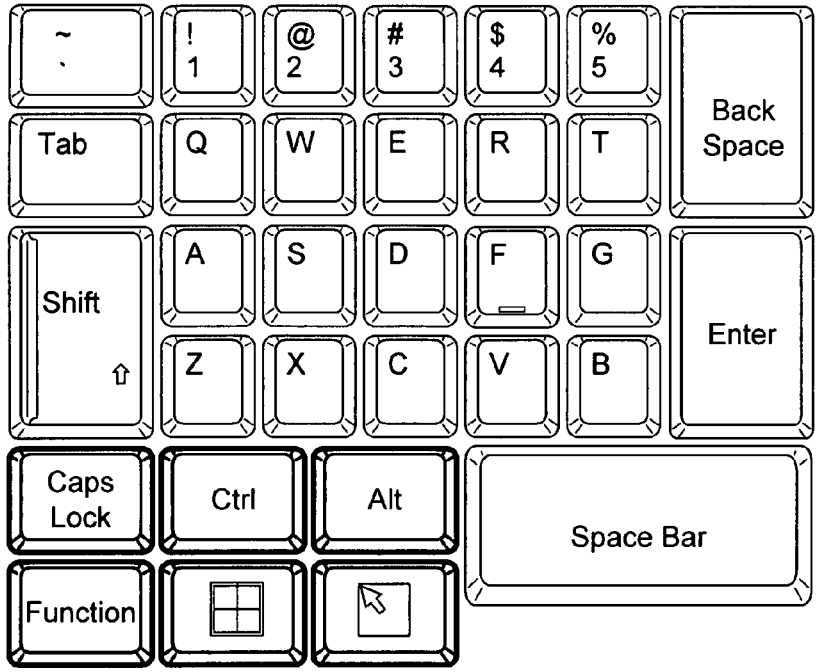
FIG. 6 is an illustration, in plan view, of the configuration of a left hand portion of "functional" ancillary keys, in accordance with the invention.

Turning now to FIG. 6, there is illustrated a preferred layout of the ancillary keys (also termed "functional" keys) of the lower left hand portion of the keyboard. As depicted in the exemplary embodiment of FIG. 6, the ancillary keys, indicated generally at 200, occupy a substantially rectangular portion of the keyboard between the outside left edge of the <SPACE BAR> key and the left edge of the keyboard. The left hand ancillary key portion suitably comprises six "functional" keys, a <CAPS LOCK> key 202, <CTRL> 204 and <ALT> 206, along with three special keys, i.e., <FUNCTION> 208 and two computer-specific operational keys, a <WINDOW> key 210 and <LAST APP> key 212, whose functions are well known to those having skill in the art. The <CAPS LOCK> 202 key is preferably placed on the left hand side of the top row of the ancillary key portion. This location allows the key to be easily struck by the left little finger without the need to lift the hand from the home row position. Additionally, the <CTRL> 204 and <ALT> 206 keys are disposed adjacent the <CAPS LOCK> key in a position substantially similar to their nominal placement on a "conventional" keyboard, with <ALT> being adjacent <SPACE BAR> key. In particular, <CAPS LOCK> is positioned in the fifth row (the home row being the third row from the top, the top herein being the numeral row) at a logical position below the <SHIFT> key, where it may be easily found but is less susceptible to inadvertent activation. The <CAPS LOCK> key, as depicted in the exemplary embodiment of FIG. 6, may serve as the sole <CAPS LOCK> on a keyboard or it may be auxiliary to the <CAPS LOCK> key 110 grouped with the "terminal" keys, as described in greater detail below.

The remaining functional keys of the left hand ancillary key portion include a <FUNCTION> key 208, disposed immediately beneath the <CAPS LOCK> key, and which serves to condition the functionality of certain portions of the keyboard to other uses and modalities. In a manner to be described in greater detail below, the <FUNCTION> key invokes the <F1> through <F12> "function" keys, as well as activates the full function numeric key pad capabilities of the novel keyboard layout. Although not shown in the exemplary embodiment of FIG. 6, the "function" keys are disposed along a row above the first (numeral) row of the novel keyboard, in a manner similar to their location on a conventional keyboard. However, the "function" keys of the invention incorporate functionality that is not provided on conventional boards, in a manner that will be described in greater detail below. The <FUNCTION> key is disposed at the extreme lower left hand corner of the keyboard, such that it is easily accessible, in a prominent location, when a user needs to adaptively reconfiguration the functionality of their keyboard.

Adjacent the <FUNCTION> key are two keys that are intended for use in operational control of a computer. A <WINDOW> key 210 is immediately adjacent the <FUNCTION> key 208 and operates to invoke certain control sequences, menus and screens of the WINDOWS graphical user interface, manufactured and sold by Microsoft Corporation of Redmond, Wash. An immediately adjacent key, a <LAST APP> key 212 (alternatively a <MENU> key) functions in a manner substantially similar to a conventional <MENU> key in that it opens menus associated with highlighted portions of an application program, in accordance with the WINDOWS operating system procedures.

It should be understood that the left hand ancillary key grouping 200 represents a rational organization of keyboard keys that have a functional purpose, as opposed to keys whose primary purpose is to identify alpha-numeric characters. These functional keys are rationally grouped in a location that is convenient to a user, rather than being spread willy-nilly across a keyboard in positions that have no rational relation to one another. In keeping with their rational relationship, the keys comprising the left hand ancillary key portion 200 are provided in contrasting colors, such that they are recognizable as an entity separate from the alpha-numeric section of the keyboard. Characteristically, each of these keys (with the exception of <ALT>) have a location different from their "standard" location on a conventional keyboard. Thus, identifying these keys in contrasting colors gives a user an additional opportunity to recognize keys having perhaps unfamiliar locations.

Figure 7:
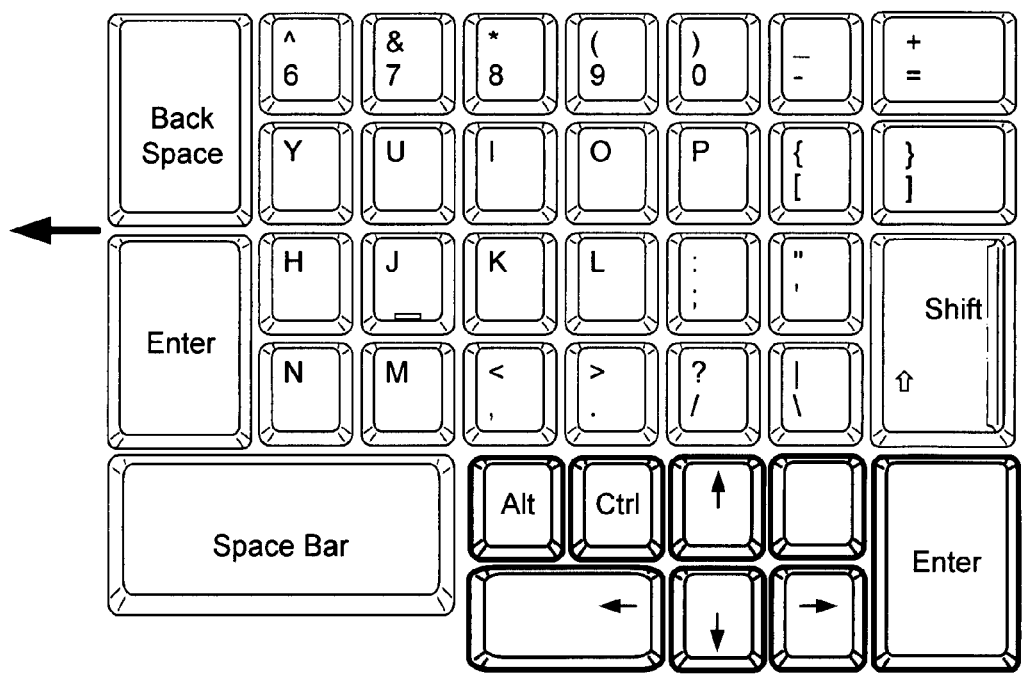
FIG. 7 is an illustration, in plan view, of the configuration of a right hand portion of "functional" ancillary keys, in accordance with the invention.

In similar fashion FIG. 7 illustrates an exemplary embodiment of the layout of ancillary (or "functional") keys of the right hand portion of the keyboard. These keys, indicated generally at 220, are also disposed in a rectangular space immediately beneath the alpha-numeric portion of the board and adjacent the right hand edge of the <SPACE BAR> key, and extend to the right hand edge of the keyboard footprint. The right hand ancillary keyboard section 220 is also two key dimensions (two rows) in height, and accommodates four columns of standard size keys, as well as an oversized (1½ key width) <ENTER> key whose purpose will be described in greater detail below.

The right hand ancillary key portion 220 also includes an <ALT> 206R and <CTRL> 204R key, as well as a set of navigation arrows 222 disposed in an inverted "T" arrow key configuration. As will be understood from the illustrated embodiment of FIG. 7, the <LEFT ARROW> key 224 is double width, where the remaining arrow keys are all unitary in size. The double width of the <LEFT ARROW> key is provided such that when the keyboard is placed in "keypad" or "numpad" mode, an oversized <0> numeral key is defined which allows an experienced user to substantially increase the speed and accuracy of numeric entries from the keypad. Additionally, a special "functional" key, a <SHUFFLE> key 226, is defined in the right hand function portion, in the <Alt> row. The <SHUFFLE> key 226 is an operational key for accessing multiple computer software applications that are "open", by "shuffling" between the various applications sequentially. This is a particularly advantageous feature for those persons using a keyboard for computer control as opposed to word processing.

Figure 8:
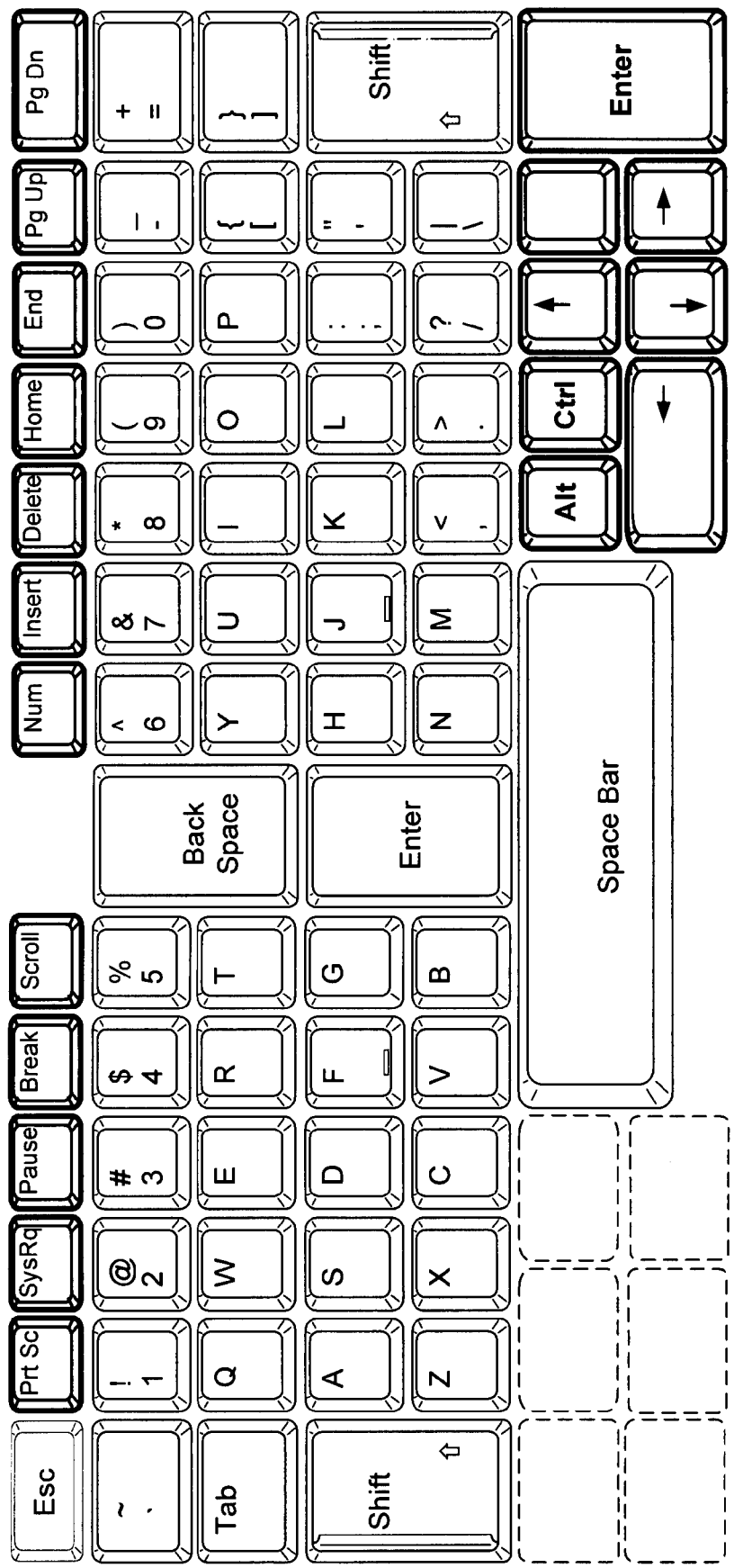
FIG. 8 is an illustration, in plan view, of the configuration of an embedded editing pad disposed in accordance with the invention.
Figure 9:
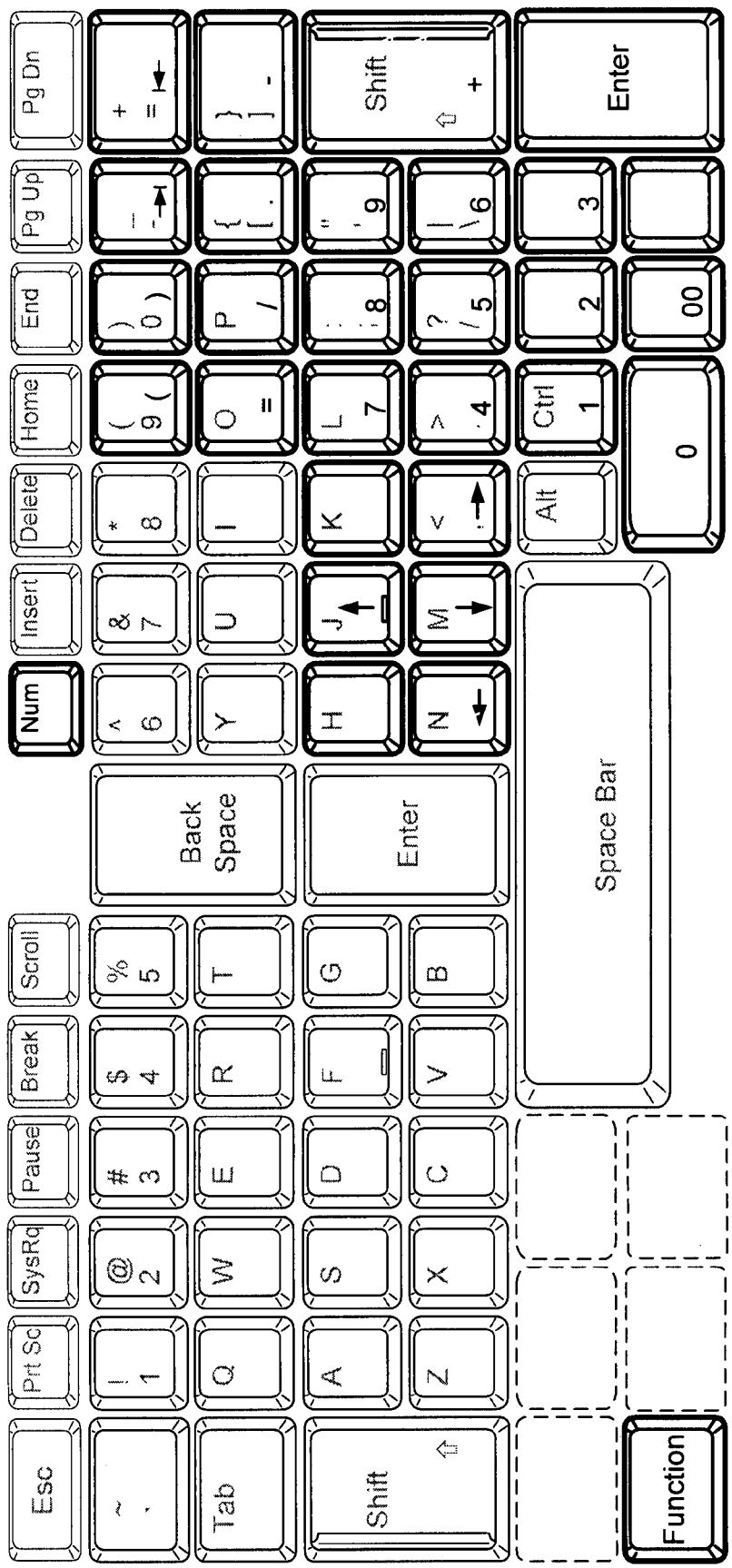
FIG. 9 is an illustration, in plan view, of the configuration of an embedded numeric keypad, disposed in accordance with the invention.

In connection with the editing pad and numeric keypad functions, FIGS. 8 and 9 illustrate the locations of the edit pad keys and numeric keypad keys, respectively. However, prior to discussing the novel arrangement and functionality of these keys, it will be necessary to digress to FIG. 10, which illustrates the position and aspect of a row of functional keys above the alpha-numeric portion of the keypad.

As is well understood by those having skill in the art, a conventional keyboard often incorporates a row of "function" keys above and separate from the remaining keys of the conventional keyboard. The "function" keys commonly include the <ESC> key, and a row of keys denoted <F1> through <F12>, in addition to a <PRINT SCREEN>, <SCROLL LOCK> and <PAUSE/BREAK> keys. The <ESC> and <F*> keys are particularly useful in various word processing programs and are often programmable to invoke particular application functionality in response to a particular function key's being depressed. <PRINT SCREEN>, <SCROLL LOCK> and <PAUSE/BREAK> keys also relate to operational control of a computer program and are particularly useful for controlling screen presentation of the word processing program.

Figure 10:
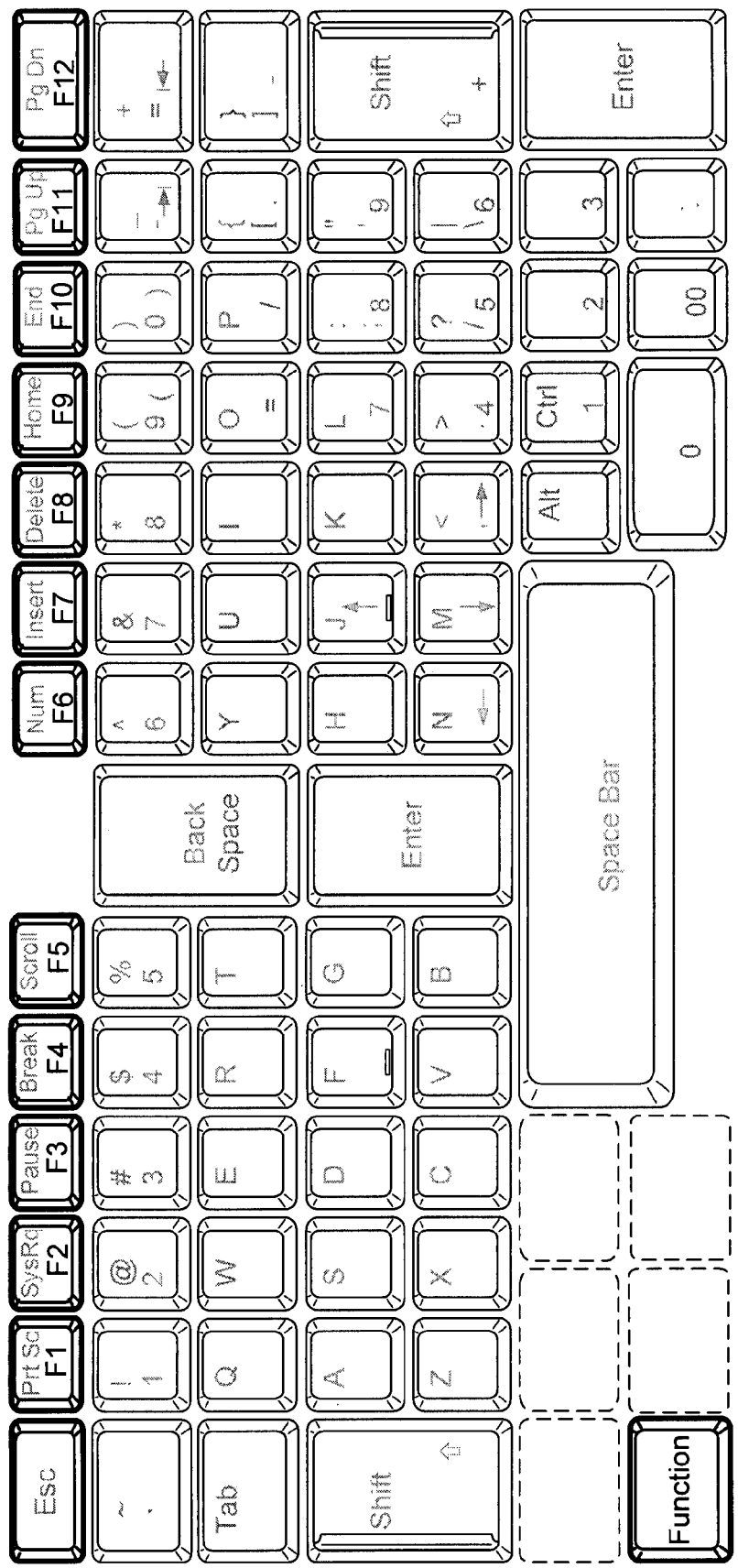
FIG. 10 is an illustration, in plan view, of the configuration of a full function keyboard of the invention, including a "function" key row.

In the exemplary embodiment of FIG. 10, these keys, as well as other functions, are incorporated into an additional top row to the alphanumeric keyboard and are implemented as keys having a slightly reduced height, so as to present a substantially rectangular aspect ratio.

Specifically, the keys of the "function" row (defined herein as row zero) incorporate all of the functionality of the prior art-type keys as well the functionality of certain of the keys of a conventional editing pad. It will be understood by those having skill in the art that the classical <F*> keys are now dual-function keys with their programmable <F*> functions being invoked after the user depresses the <FUNCTION> key 208 depicted in the ancillary key layout FIG. 6. Otherwise, the keys in the functional row operate to provide the same functionality as the conventional keys of an editing pad, although their positioning is substantially different.

Turning now to FIGS. 8 and 9, there is depicted a preferred layout of the basic elements of a combined editing pad/numeric keypad in accordance with principles of the invention. Combining the editing and numeric keypad functions into a single module allows the inclusion of a discreet editing pad on keyboards that are limited to the footprint of the alphanumeric portion only. Indeed, the ortholinear arrangement (substantially straight key rows and key columns) of the keyboard of the present invention very suitably allows incorporation of conventionally ortholinear editing pads and numeric keypads as "overlays" or "underlays" to the top level functions of the alphanumeric keyboard.

In the exemplary embodiment of FIG. 8, the navigational arrows of an editing pad are provided, in an inverted "T" configuration, as part of the right hand ancillary key portion (as seen at 222 in FIG. 7) of the keyboard. The remaining keys of the editing pad are disposed along the top row (row zero) of the keyboard, as the top level functions of the "function" keys, all of which are accessible to a user without conditioning the keyboard into a separate mode of operation. It should be noted, however, that the navigation functions <HOME>, <END>, <PAGE UP> and <PAGE DOWN>, along with the functions <INSERT> and <DELETE> are displaced from their familiar configurations and "overlay" the "functional" <F*> keys.

Turning now to the exemplary embodiment of FIG. 9, the numeric keypad is incorporated into the keyboard as an "underlay" to the normal alphanumeric keys, with the numeric keypad functionality being invoked by a user's depressing and holding the <FUNCTION> key 208 disposed in the left hand ancillary key portion 200 at the lower left hand edge of the keyboard. The numeric keypad functionality is also accessed by depressing the <NUM> or <NUM LOCK> key disposed in the upper row of the keyboard. Depressing the <NUM> or <NUM LOCK> key conditions the keyboard to operate continuously in the keypad mode, while depressing the <FUNCTION> key serves to condition the keyboard into numeric keypad mode for so long as the <FUNCTION> key is depressed.

In this regard, it should be mentioned that holding the <FUNCTION> key depressed signals the keyboard's microprocessor to issue the appropriate numeric keypad control codes by preceding each number or symbol of the numeric keypad with a "num-on" control code, such that the keyboard presents a "nominal" electronic configuration to the outside world. Control codes with <FUNCTION> on are preceded by a "num-on" character, followed by the appropriate "function" code, and followed in turn by "num-off", all under firmware control of the keyboard's microprocessor or microcontroller.

A significant feature of the numeric keypad layout of the exemplary embodiment of FIG. 9, is the integration of an inverted "T" grouping of arrow keys into the bottom two rows of the alphanumeric keyboard just adjacent to the numeric portion of the keypad, as well as the integration of an inverted "T" grouping of arrow keys (in editing pad mode) into the two lower rows of the numeric keypad. This last is made possible by providing two numeric keys, <0> and <00> in place of the double-wide <0> key of the prior art layout. Historically, many mechanical calculators incorporated just such an arrangement of <0> and <00> keys, since such an arrangement can speed the entry of financial data. The <00> in particular, speeds the entry of data where the values are in integral dollars, with no cents. By reintroducing the <00> key, the layout of the present invention allows the use of the much preferred "T" configuration of the arrow keys, when the keyboard is in its nominal configuration, rather than the "cross" arrangement of arrow keys common on prior art-type keypads. Additionally, the <0> key is made substantially wider (double key width) than a standard key, so as to conform the shape and size of the numeric keypad keys to the key configuration of conventional calculators.

An additional feature of the layout of the numeric keypad in accordance with the present invention, is the inclusion of separate left and right <TAB> keys 230 and 232 at the upper right hand portion of the numeric keypad. Navigation through tables and spreadsheets is often accomplished by using the "Tab" function and the inclusion of separate left and right <TAB> keys within the numeric keypad gives the keyboard user a substantially more efficient means of navigating through and entering data into the various spreadsheet programs commonly extent.

Additionally, the numeric keypad, in accordance with the invention, suitably incorporates left and right parentheses keys, <(>, <)> as well as an equals sign, <=> in a location proximate to the numeric portion of the keypad. All of these symbols are also "underlay" functions to the standard keyboard and are activated whenever the keyboard is placed in numeric keypad mode. The incorporation of the equals sign, open and closed parentheses, along with the left and right tab functionality serves to define an alphanumeric keypad with extended functions that make it particularly suitable for definition as a standardized, "universal" alphanumeric keypad that closely approximates a full function financial calculator as well as offering unique features that are particularly adapted to efficient navigation and data entry for electronic spreadsheet programs.

Because those versions of the present invention, which incorporate an "embedded" editing pad/numeric keypad, have several notable and novel features not present in conventional implementations where the editing pad/numeric keypad is placed at the end of the keyboard, the embedded editing/numeric keypad is discussed herein in terms of a preferred embodiment. Alternatively, a "central" editing pad/numeric keypad version, similar to that described in co-pending U.S. patent application Ser. No. 09/588,0999, filed Jun. 1, 2000, may be substituted in place of the particular layout of the "embedded" version. Advantages common to center keypad embodiments in the present invention are that the keypad is not hand-specific, and may be used with either the right or left hand. Additionally, the distance from either hand to the edge of the keyboard is minimized, reducing hand movements when simultaneously using a mouse or other pointing device. However, in the exemplary embodiment of FIG. 9, the "embedded" version of the numeric keypad is positioned on the right hand side of the keyboard such that it is right-hand accessible in a manner familiar to financial users.

Disposing a full-function numeric keypad in the four right-hand most columns of the keyboard is a significant feature of the keyboard of the invention. So positioning the numeric keypad allows for efficient right hand operation of the keys in a manner familiar to financial keypad users. Positioning the numeric keypad in this fashion avoids the stresses placed on the wrists and hands by keypads disposed in locations chosen more for packaging convenience than for ergonomic considerations. Locating the numeric keypad in the four right-hand most columns of the keyboard results in an ergonomically efficient design, with no loss of typing capability, and without imposing awkward hand placements on a user.

Figure 11:
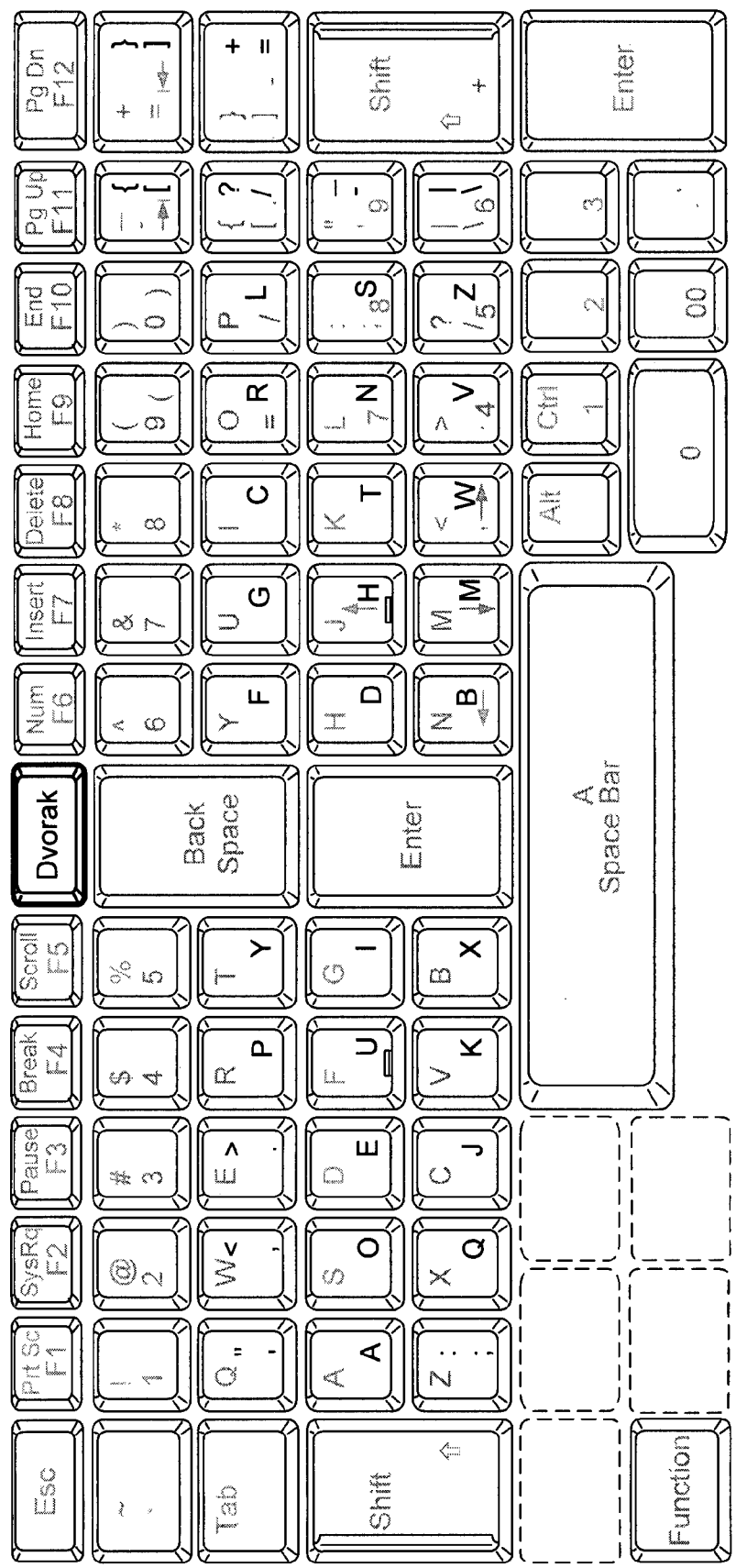
FIG. 11 is an illustration, in plan view, of the configuration of a full function keyboard of the invention, including a "Dvorak" key.

As depicted in the exemplary embodiment of FIG. 11, the presently preferred implementation of the keyboard may incorporate both the standard QWERTY alphanumeric key layout and the more recently developed ergonomic Dvorak key layout by providing the user with a <DVORAK> key thereby allowing the keyboard user to put the keyboard into Dvorak mode by enabling the desired firmware programmed encoding sequences. In the illustrated embodiment of FIG. 1, the Dvorty key definition is presented in dark letters, while the QWERTY keys ilustrated in phantom. Providing both QWERTY and Dvorak code sequences, and both sets of key labels on one keyboard, allows both QWERTY and Dvorak typists to use the same keyboard. Including the Dvorak layout as a standard feature of the keyboard serves to promote the adoption of Dvorak by more users, since users no longer need to be concerned that retraining for Dvorak will make it difficult for them to use keyboards other than their own.

Figure 12:
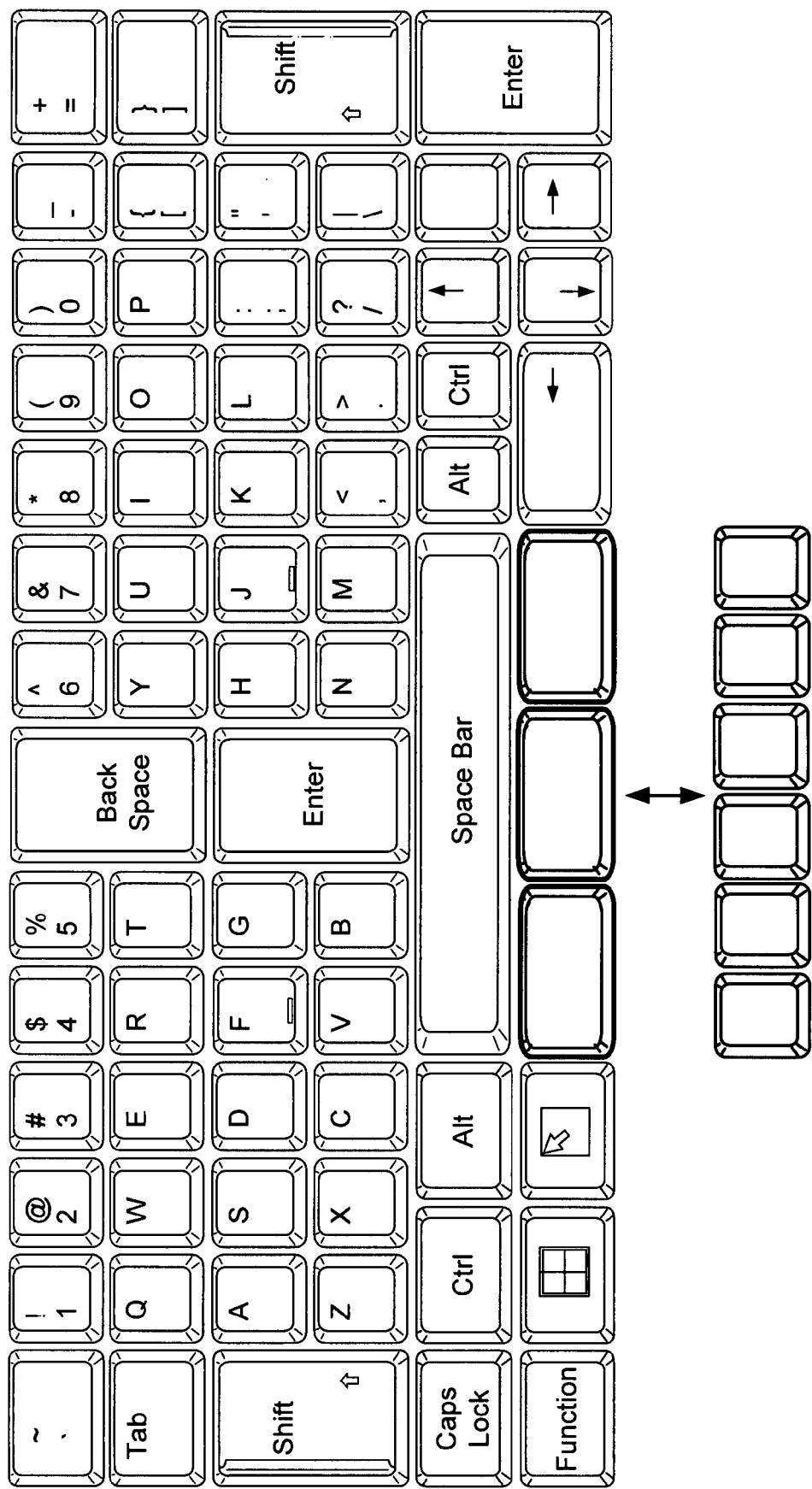
FIG. 12 is an illustration, in plan view, of the configuration of a full function keyboard of the invention, including a set of "programmable" keys.

In the exemplary embodiment of FIG. 12, it will be understood that where the <SPACE BAR> keys are provided with a nominal height (single key height), a substantial amount of space exists between the seventh row keys of the left and right hand ancillary key portions. This space is able to be filled with approximately five to six normally sized keys or alternatively, approximately three keys of double width, or two keys of triple width. Since these keys have no conventional definition, it will be understood by those having skill in the art that they may be adaptively configured for user programmability. These keys might be provided on a commercially available keyboard, with the functionality of these keys defaulting to perhaps a <SPACE BAR>, but would be made available for various user defined functions.

Figure 13:
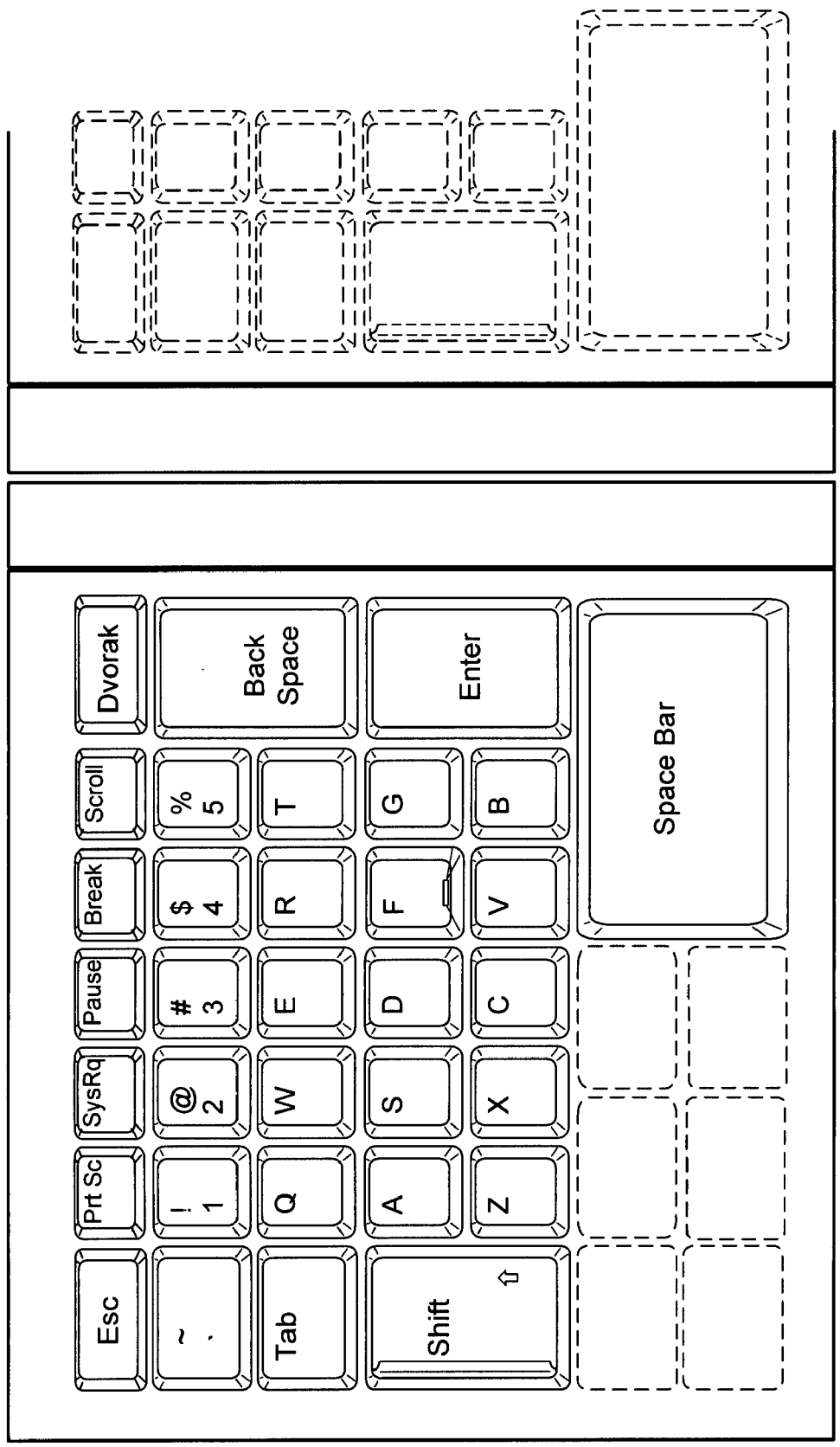
FIG. 13 is an illustration, in plan view, of the configuration of a full function keyboard of the invention, configured for folding into compact volume.

Given the ortholinear character (rectilinear matrix) of the keyboard, it should be understood that a very compact keyboard results from the particular arrangement of the keys. Additionally, overlaying the right-hand portion of the keyboard and the numeric keypad allows the keyboard to be split into separate left and right hand segments, while preserving the full functionality of the standard keyboard. In particular, the exemplary embodiment of FIG. 13 illustrates the keyboard separated into right hand and left hand modules which may be physically separated from one another and coupled by an electrical cable, radio frequency (RF), or infrared (IR) interface. This allows the modules to be placed at a comfortable separation distance or they might be joined together, such as by a hinge, to thereby allow the entire keyboard to be folded over into a very small unit for transport and storage. The exemplary embodiment of FIG. 12 illustrates a keyboard configured such that each module fits within the dimensions of a standard compact disc (CD) "jewel box" case, with the modules hinged such that when folded for transport or storage, the entire keyboard may be no larger than a standard "double" CD case. Again, it should be noted that the standard layouts of the alphanumeric keyboard and fully functional numeric keypad is fully preserved in a keyboard of minimal physical size.

The foregoing has been a description of particular exemplary embodiments of various details of a keyboard in accordance with the invention. It will be recognized by those having skill in the art that departures from the illustrated embodiments may be made without departing from the scope of the invention and that obvious modifications will occur to a person having skill in the art with recourse to the foregoing specification. It is the intent of applicant that the invention include various alternative implementations that perform the same functions as those disclosed in the accompanying illustrations. Specification should not be construed to unduly narrow the full scope of protection to which the invention is entitled.

The corresponding structures, materials, acts and equivalents of all means or step plus function elements in the claims below are intended to include any structure, material or acts for performing the functions in combination with other claimed elements as specifically claimed.

What is claimed is:

1. A universal keyboard of the type comprising an alphanumeric portion having keys arranged in a plurality of substantially straight vertical columns and a plurality of substantially straight horizontal rows, including a home row, so as to define an ortholinear array, the keyboard further comprising:
   left and right hand SHIFT keys, the SHIFT keys elongated vertically and oriented substantially parallel to the substantially straight vertical rows, the SHIFT keys including a portion disposed in-line with the keys of the home row;
   a centrally disposed ENTER key, the ENTER key elongated vertically and oriented substantially parallel to the substantially straight vertical rows, the ENTER key including a first portion disposed in-line with the keys of the home row and a second portion disposed in-line with the keys of the row below the home row;
   a centrally disposed BACK SPACE key, the BACK SPACE key elongated vertically and oriented substantially parallel to the substantially straight vertical rows, the BACK SPACE key disposed above the ENTER key and in-line with the keys of the two rows adjacent and above the home row;
   a horizontally elongated, thumb activated SPACE BAR, disposed adjacent and below the ENTER key; and
   wherein the plurality of substantially straight horizontal rows defines six contiguous horizontal rows of keys.

2. The universal keyboard according to claim 1, wherein the ENTER, BACK SPACE and SPACE BAR keys are vertically separated into independently activated left and right hand portions.

3. The universal keyboard according to claim 1, further comprising:
   a first functional control portion disposed in a rectangular region defining fifth and sixth key rows and located adjacent a first lateral edge of the SPACE BAR, the first functional control portion including at least a FUNCTION key for placing the keyboard into an operational mode different from a default operational mode; and
   a second functional control portion disposed in a rectangular region defining fifth and sixth key rows and located adjacent a second lateral edge of the SPACE BAR, the second functional control portion including cursor control navigation arrows disposed in an inverted T configuration.

4. The universal keyboard according to claim 1, further comprising:
   a full-function numeric keypad disposed within the alphanumeric portion and the second functional control portion, the numeric keypad key functions accessible by a user depressing a FUNCTION key; and
   wherein a LEFT ARROW key of the navigation arrows defines a 0 key of the numeric keypad, the LEFT ARROW key being two key dimensions in width.

5. The universal keyboard according to claim 1, further comprising:

a row of function keys disposed in a row zero position, immediately above and adjacent a numeral row of the alpha portion, the function keys and the second functional control portion defining at least an editing pad.

6. The universal keyboard according to claim 1, further comprising:
an additional set of cursor control navigation arrows disposed adjacent the numeric keypad, the additional set of cursor control navigation arrows accessible along with the numeric keypad by a user depressing a FUNCTION key; and
a NUM LOCK key, the numeric keypad periodically accessible by a user by holding the FUNCTION key depressed, or continuously accessible by depressing the NUM LOCK key.

7. The universal keyboard according to claim 6, the numeric keypad further comprising:
numerals 1 through 9 arranged in a square 3×3 key matrix;
a numeral 00 key, positioned adjacent and below the numeral 2 key;
an oversized numeral 0 key, positioned immediately left adjacent the numeral 00 key;
arithmetic operator keys; and
independent left and right PAREN keys, the left and right PAREN keys functional when the keyboard is placed in numeric keypad mode by depressing the NUM LOCK or FUNCTION key.

8. The universal keyboard according to claim 7, the numeric keypad further comprising independent left and right TAB keys, the left and right TAB keys functional when the keyboard is placed in numeric keypad mode by depressing the NUM LOCK or FUNCTION key.

9. The universal keyboard according to claim 1, wherein depressing a FUNCTION key conditions keyboard control codes to assert a scan code for a numeric keypad key preceded by a "num lock on" code and followed by a "num lock off" code, thereby mimicking depression of a NUM LOCK key.

10. The universal keyboard according to claim 1, further comprising a functional control key for configuring the alphanumeric portion of the keyboard between QWERTY and Dvorak modes of operation.

11. The universal keyboard according to claim 1, wherein the ENTER and BACK SPACE keys are located so as to be struck by an index finger when the hands are in nominal position for typing.

12. The universal keyboard according to claim 1, wherein the ENTER key is located so as to be struck by a thumb when the hands are in nominal position for typing.

13. The universal keyboard according to claim 1, wherein the keyboard defines seven, substantially horizontal rows of keys, the SPACE BAR disposed within a next higher row from a bottom row of the keyboard, the bottom row defining user programmable keys in a region adjacent and below the SPACE BAR and between the first and second functional control portions.

14. The universal keyboard according to claim 1, wherein the keyboard defines seven, substantially horizontal rows of keys, the SPACE BAR disposed within a next higher row from a bottom row of the keyboard and extending vertically into at least a portion of the bottom row.

15. The universal keyboard according to claim 1, further comprising:
a QWERTY operational mode;
a Dvorak operational mode; and
a numeric keypad/function operational mode; and wherein each operational mode is key selectable such that particular ones of the keys of the keyboard are functional in accordance with three operational modes.

16. The universal keyboard according to claim 15, wherein the numeric keypad/function operational mode is implemented by a numeric keypad, and wherein the numeric keypad is defined by keys comprising the four right-hand most columns of the keyboard.

17. The universal keyboard according to claim 1, wherein the BACK SPACE key and the ENTER key have substantially similar widths and form a substantially straight column.

18. A universal keyboard of the type comprising an alphanumeric portion having keys arranged in a plurality of substantially straight vertical columns and a plurality of substantially straight horizontal rows, including a home row, so as to define an ortholinear array, the keyboard further comprising:
left and right hand SHIFT keys, the SHIFT keys elongated vertically and oriented substantially parallel to the substantially straight vertical rows, the SHIFT keys including a portion disposed in-line with the keys of the home row;
a centrally disposed ENTER key, the ENTER key elongated vertically and oriented substantially parallel to the substantially straight vertical rows, the ENTER key including a first portion disposed in-line with the keys of the home row and a second portion disposed in-line with the keys of the row below the home row;
a centrally disposed BACK SPACE key, the BACK SPACE key elongated vertically and oriented substantially parallel to the substantially straight vertical rows, the BACK SPACE key disposed above the ENTER key and in-line with the keys of the two rows adjacent and above the home row;
a horizontally elongated, thumb activated SPACE BAR, disposed adjacent and below the ENTER key; and
wherein the BACK SPACE key and the ENTER key have substantially similar widths and form a substantially straight column.

19. The universal keyboard according to claim 18, wherein the ENTER, BACK SPACE and SPACE BAR keys are vertically separated into independently activated left and right hand portions.

20. The universal keyboard according to claim 18, further comprising:
a first functional control portion disposed in a rectangular region defining fifth and sixth key rows and located adjacent a first lateral edge of the SPACE BAR, the first functional control portion including at least a FUNCTION key for placing the keyboard into an operational mode different from a default operational mode; and
a second functional control portion disposed in a rectangular region defining fifth and sixth key rows and located adjacent a second lateral edge of the SPACE BAR, the second functional control portion including cursor control navigation arrows disposed in an inverted T configuration.

21. The universal keyboard according to claim 18, further comprising:
a full-function numeric keypad disposed within the alphanumeric portion and the second functional control portion, the numeric keypad key functions accessible by a user depressing a FUNCTION key; and
wherein a LEFT ARROW key of the navigation arrows defines a 0 key of the numeric keypad, the LEFT ARROW key being two key dimensions in width.

22. The universal keyboard according to claim 18, further comprising:

a row of function keys disposed in a row zero position, immediately above and adjacent a numeral row of the alpha portion, the function keys and the second functional control portion defining at least an editing pad.

23. The universal keyboard according to claim 18, further comprising:
    an additional set of cursor control navigation arrows disposed adjacent the numeric keypad, the additional set of cursor control navigation arrows accessible along with the numeric keypad by a user depressing a FUNCTION key; and
    a NUM LOCK key, the numeric keypad periodically accessible by a user by holding the FUNCTION key depressed, or continuously accessible by depressing the NUM LOCK key.

24. The universal keyboard according to claim 23, the numeric keypad further comprising:
    numerals 1 through 9 arranged in a square 3×3 key matrix;
    a numeral 00 key, positioned adjacent and below the numeral 2 key;
    an oversized numeral 0 key, positioned immediately left adjacent the numeral 00 key;
    arithmetic operator keys; and
    independent left and right PAREN keys, the left and right PAREN keys functional when the keyboard is placed in numeric keypad mode by depressing the NUM LOCK or FUNCTION key.

25. The universal keyboard according to claim 24, the numeric keypad further comprising independent left and right TAB keys, the left and right TAB keys functional when the keyboard is placed in numeric keypad mode by depressing the NUM LOCK or FUNCTION key.

26. The universal keyboard according to claim 18, wherein depressing a FUNCTION key conditions keyboard control codes to assert a scan code for a numeric keypad key preceded by a "num lock on" code and followed by a "num lock off" code, thereby mimicking depression of a NUM LOCK key.

27. The universal keyboard according to claim 18, further comprising a functional control key for configuring the alpha-numeric portion of the keyboard between QWERTY and Dvorak modes of operation.

28. The universal keyboard according to claim 18, wherein the ENTER and BACK SPACE keys are located so as to be struck by an index finger when the hands are in nominal position for typing.

29. The universal keyboard according to claim 18, wherein the ENTER key is located so as to be struck by a thumb when the hands are in nominal position for typing.

30. The universal keyboard according to claim 18, wherein the keyboard defines seven, substantially horizontal rows of keys, the SPACE BAR disposed within a next higher row from a bottom row of the keyboard, the bottom row defining user programmable keys in a region adjacent and below the SPACE BAR and between the first and second functional control portions.

31. The universal keyboard according to claim 18, wherein the keyboard defines seven, substantially horizontal rows of keys, the SPACE BAR disposed within a next higher row from a bottom row of the keyboard and extending vertically into at least a portion of the bottom row.

32. The universal keyboard according to claim 18, further comprising:
    a QWERTY operational mode;
    a Dvorak operational mode; and
    a numeric keypad/function operational mode; and wherein each operational mode is key selectable such that particular ones of the keys of the keyboard are functional in accordance with three operational modes.

\* \* \* \* \*